Sept. 18, 1945.  E. GARTHWAITE  2,385,131
TUNING DEVICE FOR RADIO CIRCUITS
Filed May 25, 1944
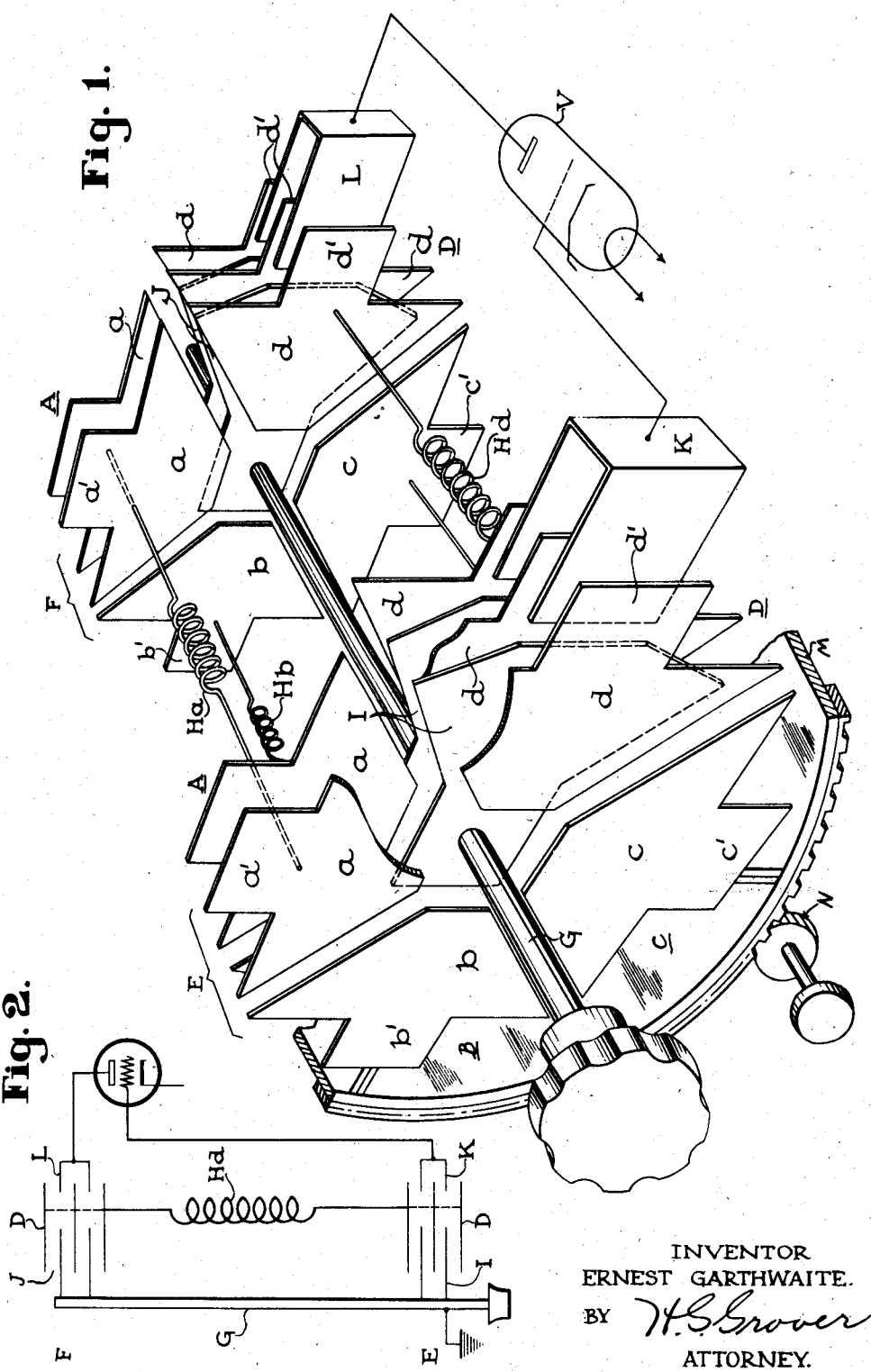
INVENTOR
ERNEST GARTHWAITE.
BY *H.S.Grover*
ATTORNEY.

Patented Sept. 18, 1945

2,385,131

UNITED STATES PATENT OFFICE 2,385,131

TUNING DEVICE FOR RADIO CIRCUITS

Ernest Garthwaite, Saint Albans, England, assignor to Radio Corporation of America, a corporation of Delaware Application May 25, 1944, Serial No. 537,213
In Great Britain January 7, 1943

5 Claims. (Cl. 250—40)

The present invention relates to tuned radio circuits and provides an improved tuning device, whereby changes can be made from one tuned circuit, for example from one range of frequencies, to another without the necessity of providing contact closing switches.

According to the invention, a tuning and range changing device for tuned radio circuits includes a plurality of sets of condenser stator vanes arranged radially about a spindle, a plurality of inductances one associated with each set of stator vanes, said spindle, a set of condenser rotor vanes mounted on said spindle, a set of further condenser vanes, and means for producing movement of said stator vanes relatively to said set of further vanes for associating any one of said sets of stator vanes with said set of further vanes, and for variably associating the set of rotor vanes with said associated set of stator vanes.

The electrodes of a valve constituting, for example, the valve of an oscillatory circuit, may be connected to the set of further vanes.

One arrangement according to the invention is illustrated in the accompanying drawing wherein Fig. 1 is a view in perspective showing the tuning system employed; and Fig. 2 is a diagrammatic showing of the electrical circuit for the frequency range to which the system is set in Fig. 1. In this arrangement there are provided four sets of stator vanes A, B, C and D, each set comprising the requisite number of vanes, $a$, $b$, $c$ and $d$, divided into two groups as E and F. The stator vanes are of wedge or triangular shape with a rectangular extension as $a'$, $b'$, $c'$ and $d'$ from the base. The sets of stator vanes are mounted around a rotary spindle G so as, roughly, to resemble a number of Maltese crosses mounted one behind the other. The vanes, as $a$, of each set, as A are suitably spaced from each other, and the groups E and F are also suitably spaced from each other. The vanes of each group are connected together and four inductances (only three $H_a$, $H_b$ and $H_d$ being visible in the figure of drawing) are connected each from the stators of one group E to the corresponding stators of the other group F. The several stator sets are rigidly fixed to a rotatable mounting M so that the whole assembly can by suitable means shown generally at N be rotated in steps relatively to the spindle through angles of 90 degrees. The mounting is not fully illustrated in the drawing, but the arrangement of it is readily conceivable. The apices of the triangles are removed, so as to leave a clearance for the spindle at the centers of the Maltese crosses.

Fixed upon and for rotation with the spindle, is a set of rotor vanes also divided into two groups I and J. The rotor vanes of the two groups are appropriately spaced from each other and the groups are likewise spaced from each other. The rotors of the two groups are connected together.

The stator assembly can occupy any one of four angularly displaced positions, and in any one of these positions one set of stator vanes A, B, C or D is associated with the rotor vanes, one group of each with one group of the other.

Situated adjacent to the stator assembly is a set of fixed vanes. These fixed vanes are divided into two groups K and L and the vanes of each group are appropriately spaced from each other, the groups being likewise spaced from each other. The fixed vanes of each set are connected together and the two groups are so situated that the vanes are capacitatively coupled with the rectangular extension on a desired one set of stators, brought into association with it by rotation of the stator assembly. Electrodes (for example the anode and grid) of a valve V are connected to the fixed vanes K and L, one electrode to each group.

When the device of the invention is employed as part of a variable band, tuned oscillator circuit, any one of the circuits constitutes a series-gap condenser-tuned circuit which may be traced as follows: from the anode of the valve, through an anode coupling condenser constituted by one group L of fixed vanes and the rectangular extensions (for example $d'$ on the vanes $d$) of one group D of the selected set of stator vanes, a variable tuning condenser constituted by the vanes of the said one group F of the selected set of stator vanes, and one group of the set of rotor vanes, a connection which may be the spindle G connecting this group of rotor vanes to the other group I of rotor vanes, a second variable tuning condenser constituted by these latter rotor vanes and the vanes of the other group E of the selected set of stator vanes, a grid coupling condenser constituted by the rectangular extension $d'$ on the vanes $d$ of this other group E of the selected stator vanes and the vanes of the other group K of fixed vanes, to the grid of the valve. The inductance $H_d$ is connected from one group F of stator vanes to the other group E.

To change the range, the stator assembly is rotated through the necessary arc, in the case under consideration 90° from one range to the next, so that a different set of stators, as for example A, and a different inductance $H_a$, are capacitatively coupled, by the rectangular extensions and the fixed vanes to the valve.

Tuning within a range is effected by rotating the spindle, and with it, the rotor vanes.

In addition to the elimination of contact closing switches for range changing, the device has the following advantages:

(a) That the open circuit natural frequencies of high inductance coils out of operation can be reduced to fall below the limits of the band in use, since they are tuned always by their associated variable condensers.

(b) That the coupling between the oscillator valve and each tuned circuit can have an optimum value without the employment of switching.

(c) That the physical space occupied by the components forming the tuned circuit is kept to a minimum and the leads in each tuned circuit kept as short as possible.

(d) That the components forming the radio frequency circuit may readily be screened as a single unit.

In what has been said in the above particular description, it has been assumed that the stator vanes are mounted in a rotatable mounting. Clearly, the spindle and rotors, and the further vanes could, instead, be so mounted for the production of the necessary relative movement.

What I claim is:

1. A tuning and range changing device for tuned radio circuits comprising a shaft, a plurality of sets of condenser stator vanes arranged radially about said shaft, a plurality of inductances each of which is mechanically supported by and electrically connected to a respective one of said sets of stator vanes, a set of condenser rotor vanes mounted on said shaft, a set of further condenser vanes, and means for producing movement of said stator vanes relatively to said set of further vanes for associating any one of said sets of stator vanes with said set of further vanes, and for variably associating the set of rotor vanes with said associated set of stator vanes.

2. A tuning and range changing device for tuned radio circuits comprising at least two sets of condenser stator vanes each set of which is divided into two groups of vanes, the vanes of each group being directly connected together electrically, and the groups of either set being inductively connected together; one set of condenser rotor plates divided into two groups of vanes, the vanes of both groups being directly connected together electrically; one set of further vanes divided into two groups of vanes, the vanes of either set being directly connected together and each group serving as a means for connection to an external connection; means for bringing either set of stator vanes into association with the set of further vanes in such manner that each group of stator vanes is capacitatively related to a different group of further vanes and for associating the rotor vanes with the set of stator vanes associated with the set of further vanes in such manner that such group of rotor vanes is in variable capacitative relationship with a different group of stator vanes.

3. A device as claimed in claim 1, wherein the sets of stator vanes are mounted in a frame for rotation about a central axis so as to bring them into capacitative relationship with said further vanes.

4. A device as claimed in claim 1, wherein there are set four sets of stator vanes arranged about said shaft or central axis substantially in the form of a Maltese cross.

5. A device as claimed in claim 1, wherein the rotor vanes are assembled upon said shaft having limited angular rotation whereby the capacitance between said rotor vanes and a selected set of stator vanes may be varied.

ERNEST GARTHWAITE.